US010550948B2

(12) United States Patent
Haeusser et al.

(10) Patent No.: US 10,550,948 B2
(45) Date of Patent: Feb. 4, 2020

(54) DISCHARGE VALVE COMPRISING A RECEIVING ELEMENT

(71) Applicant: Robert Bosch GmbH, Stuttgart (DE)

(72) Inventors: Bernd Haeusser, Neckarwestheim (DE); Rolf Stotz, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/318,830

(22) PCT Filed: May 29, 2015

(86) PCT No.: PCT/EP2015/061983
§ 371 (c)(1),
(2) Date: Dec. 14, 2016

(87) PCT Pub. No.: WO2015/197307
PCT Pub. Date: Dec. 30, 2015

(65) Prior Publication Data
US 2017/0138490 A1  May 18, 2017

(30) Foreign Application Priority Data
Jun. 26, 2014  (DE) .................... 10 2014 212 292

(51) Int. Cl.
*F16K 15/04* (2006.01)
*B60T 8/40* (2006.01)
(Continued)

(52) U.S. Cl.
CPC ............ *F16K 15/044* (2013.01); *B60T 8/341* (2013.01); *B60T 8/4031* (2013.01); *F04B 53/1002* (2013.01); *F04B 53/1087* (2013.01)

(58) Field of Classification Search
CPC .. F16K 15/04; F04B 1/04; F04B 53/10; F04B 53/12; B60T 8/40
See application file for complete search history.

(56) References Cited

U.S. PATENT DOCUMENTS 1,430,986 A * 10/1922 Hallman ............. F04B 53/1002
137/515.5
5,609,182 A   3/1997 Beck et al.
(Continued)

FOREIGN PATENT DOCUMENTS

CN        102094808 A    6/2011
EP        0 446 454 B1   9/1991
(Continued)

OTHER PUBLICATIONS

International Search Report corresponding to PCT Application No. PCT/EP2015/061983, dated Sep. 24, 2015, (German and English language document) (5 pages).

*Primary Examiner* — Umashankar Venkatesan
(74) *Attorney, Agent, or Firm* — Maginot, Moore & Beck LLP

(57) ABSTRACT

A discharge valve for a hydraulic pump of a hydraulic unit defines a valve port, and includes a valve body and a receiving element. The valve body is configured to seal off the valve port. The receiving element adjoins the valve port, and defines a cavity configured to receive the valve body. The cavity has a longitudinal axis and an inner wall with a radially outwardly oriented pocket configured to receive the valve body.

20 Claims, 3 Drawing Sheets

(51) Int. Cl.
*F04B 53/10* (2006.01)
*B60T 8/34* (2006.01)

(56) References Cited

U.S. PATENT DOCUMENTS

| | | | | |
|---|---|---|---|---|
| 6,283,724 B1* | 9/2001 | Alaze | B60T 8/4031 | 417/273 |
| 6,283,733 B1* | 9/2001 | Merklein | B60T 8/4031 | 417/549 |
| 6,361,295 B2* | 3/2002 | Schuller | B60T 8/4031 | 417/549 |
| 6,394,770 B1* | 5/2002 | Siegel | B60T 8/4031 | 417/470 |
| 6,622,751 B1 | 9/2003 | Beck et al. | | |
| 2003/0170133 A1* | 9/2003 | Schaefer | B60T 8/4031 | 417/470 |

FOREIGN PATENT DOCUMENTS

| | | |
|---|---|---|
| GB | 2 476 157 A | 6/2011 |
| JP | 8-503759 A | 4/1996 |
| JP | 2002-502940 A | 1/2002 |

\* cited by examiner

DISCHARGE VALVE COMPRISING A RECEIVING ELEMENT

This application is a 35 U.S.C. § 371 National Stage Application of PCT/EP2015/061983, filed on May 29, 2015, which claims the benefit of priority to Serial No. DE 10 2014 212 292.9, filed on Jun. 26, 2014 in Germany, the disclosures of which are incorporated herein by reference in their entirety.

The disclosure relates to a discharge valve for a hydraulic pump of a hydraulic assembly, having a valve opening which can be closed off by a valve body and a receiving element which adjoins the valve opening for receiving the valve body in a cavity formed therein.

BACKROUND

Generic hydraulic assemblies are used in particular in vehicle brake systems for ABS and ESP brake systems in order to generate brake pressures regulated there at wheel brakes of an associated motor vehicle. The hydraulic assembly comprises a hydraulic pump which operates according to the principle of a piston pump. Several pump elements are generally provided in a block-shaped pump housing. Each pump element has a discharge valve for discharge of fluid to be conveyed through a valve opening on a face side of a cup-shaped pump cylinder. A piston is mounted axially displaceably in the pump cylinder, which piston projects with one of its ends into the pump cylinder and at its other end is supported and driven by means of an eccentric shaft driven by a pump motor. The eccentric shaft generates a sinusoidal translational stroke movement of the piston by means of rotational movements, with which stroke movement fluid can be conveyed and pressurized.

In the case of a movement of the piston into the pump cylinder, the fluid is pushed against the face side of the pump cylinder. Pushed in such a manner, the fluid lifts a valve body from a valve seat which surrounds the valve opening and pushes the valve body against a restoring spring which is located in a circular-cylindrical cavity of a valve cover arranged on the pump cylinder. The valve cover for the valve body also serves as a receiving element in which the valve body is already received partially in the idle state.

When lifting the valve body from the valve seat, the valve body is pushed into the cavity of such a receiving element, the valve opening is opened and the fluid flows past the valve body out of the pump cylinder. The fluid which flows out in such a manner is, as described, for example, in EP 0 446 454 B1, guided by means of an outflow duct into the pump housing. During outflow, vibrations of the valve body occur which are responsible among other things also for undesirable noises during conveying of fluid in the hydraulic assembly.

SUMMARY

According to the disclosure, there is created a discharge valve for a hydraulic pump of a hydraulic assembly, having a valve opening which can be closed off by a valve body and a receiving element which adjoins the valve opening for receiving the valve body in a cavity formed therein, which cavity comprises a longitudinal axis and an inner wall. Here, the inner wall has a pocket which is directly radially outwards and into which the valve body can enter. The pocket forms in particular a bulge of the cavity or recess of the inner wall and is thus arranged eccentrically in relation to the longitudinal axis of the cavity. By means of such a pocket, the valve body can move out of the actual cavity into the pocket and can thus escape a flow of the fluid prevailing there. The flow of the fluid occurring around the valve body retains the valve body in a localized manner in and/or on the pocket.

The disclosure is based on the knowledge that the receiving element, by means of its cavity, must retain the valve body centrally in front of the valve opening on a valve seat which surrounds the valve opening. Otherwise the valve body would not close off the valve opening over the full circumference. To this end, the cavity has, as is known, by means of its inner wall a longitudinal axis which is at least approximately congruent with a longitudinal axis of the valve opening. According to the disclosure, a radially outwardly directed pocket is now provided on the inner wall. Such a pocket enables positioning of the valve body in a state lifted up from the valve seat eccentrically in relation to the longitudinal axis of the cavity and thus to the longitudinal axis of the valve opening. During opening of the valve opening, to this end, the valve body is initially lifted up from its central location. The pocket according to the disclosure then acts on the lifted valve body in combination with the flow of the fluid by means of which the valve body is moved into an eccentric location in relation to the longitudinal axis of the cavity. The valve body is therefore guided out of the center of the cavity and fluid flows around it in particular on its side facing away from the pocket so that a flow guidance amplified in a defined manner is only carried out on one side of the valve body. Such a flow guidance pushes the valve body onto or into the pocket. The valve body is thus retained centered in terms of its location and in a defined location. Retained in such a manner, the valve body can no longer be caused to vibrate in the case of fluid flowing or flowing out through the valve opening, which avoids undesirable noises and a particularly low-noise discharge valve.

The valve body is preferably configured as a ball which is to be received in a cavity with a preferably cylindrical, in particular circular-cylindrical configuration. By means of the configuration as a ball, the valve body has a spherical surface which always has the correct location without corners and edges in order to be able to slide into the pocket. To this end, the pocket is particularly preferably substantially complementary to a part of the spherical surface so that the ball can be retained in a space-saving manner and particularly expediently in the pocket in terms of flow.

The receiving element is furthermore preferably also a valve cover of the discharge valve in a component-saving manner.

According to the disclosure, the pocket is furthermore advantageously open towards the valve opening. The valve body can move into such an open pocket during lifting up from the valve opening immediately into the pocket so that the valve body can be immediately aligned and retained in the pocket. Vibrations of the valve body which would otherwise occur can therefore be avoided without any time delay.

According to the disclosure, the pocket is furthermore preferably formed to be cylindrical, in particular circular-cylindrical, and axially parallel to the longitudinal axis of the cavity. Formed in such a manner, the valve body can move into the pocket without otherwise disruptive pocket recesses or bulges of the pocket. In the pocket, the valve body can furthermore rest against the pocket wall in a particularly space-saving manner. Flow turbulence in the fluid flow is additionally almost avoided with a pocket formed in such a manner, which retains the valve body in a particularly stable manner in and/or on the pocket in the case of outflowing fluid.

According to the disclosure, the pocket furthermore extends advantageously, as seen in the cross-section of the cavity, on its inner wall over an angle of 30° to 180°, preferably of 40° to 120° and particularly preferably of 50° to 90°. With such an angle, sufficient space is created in the pocket in order to be able to align and retain the valve body. The space is also restricted in such a manner that the location of the valve body is adequately defined in order to be able to avoid vibrations of the valve body in the fluid flow.

According to the disclosure, axially between the pocket and the valve opening, at least one radial outflow duct is also preferably provided in such a manner that, in the case of an orthogonal projection onto a plane of the at least one radial outflow duct and the pocket, the at least one radial outflow duct is arranged on the pocket. With such a radial outflow duct, fluid can be discharged in particular into an outlet region of a pump housing for further work. During discharge, a pressure gradient prevails between a high fluid pressure in the direction of flow upstream of the valve body and a fluid pressure which is low in comparison to this in the direction of flow downstream of the valve body. Such a pressure gradient leads in particular to outflowing fluid exerting suction on the valve body in the direction of the outflow duct. It has been shown that such suction is particularly active on a region in and around the pocket according to the disclosure if the pocket is advantageously arranged, in the case of an orthogonal projection onto a plane, on the at least one radial outflow duct and thus in particular in its vicinity. Arranged in such a manner, the valve body can be retained particularly reliably in and/or on the pocket in the case of outflowing fluid.

The at least one radial outflow duct is preferably arranged in the receiving element radially on the cavity in a component-saving manner.

Moreover, the at least one outflow duct according to the disclosure is advantageously a first radial outflow duct and a second radial outflow duct, wherein the second radial outflow duct extends asymmetrically to the first radial outflow duct. Asymmetrical signifies in particular here that the second radial outflow duct runs neither point-symmetrically nor axis-symmetrically in relation to the first radial outflow duct. With such asymmetrically arranged outflow ducts, vibrations exerted by the valve body are additionally reduced during conveying operation, with pulsations in the fluid flow generated by a stroke motion of the pump piston also being damped. The pocket according to the disclosure can thus retain the valve body particularly reliably and with a low level of vibrations.

To this end, the pocket is preferably arranged on the inner wall of the cavity in an orthogonal projection onto a plane between the first and the second radial outflow duct. Arranged in such a manner, the fluid can flow out of both radial outflow ducts and thereby exert particularly strong suction on the pocket and the valve body retained thereon. For this purpose, an angle between the first radial outflow duct and the second radial outflow duct of 30° to 180°, preferably of 40° to 130° and particularly preferably of 50° to 100° has proved to be advantageous. In particular, both radial outflow ducts are positioned in such a manner that they are located on the pocket at their end regions in the axial projection in cross-section. The pocket is thus arranged in the center of both radial outflow ducts which additionally reduces vibrations in the fluid and amplifies the vibration-reducing action of the pocket.

Moreover, the least one radial outflow duct is arranged according to the disclosure advantageously in a fluid-conducting manner on a circumferential duct which surrounds a valve seat surrounding the valve opening over the full circumference with its valve seat circumference. For this purpose, the circumferential duct is preferably arranged in the receiving element on the inner wall of the cavity axially between the valve opening and the pocket. Arranged in such a manner, fluid flowing through the valve opening can be discharged immediately beyond the entire valve seat circumference which avoids a fluid build-up around the valve body in a vibration-reducing manner. The circumferential duct furthermore distributes the outflowing fluid to several radial outflow ducts, in particular to the first and second radial outflow duct. The circumferential duct additionally prevents in the case of outflowing fluid that the valve body rests against the at least one outflow duct which would otherwise throttle the fluid in terms of its volumetric flow.

Such a circumferential duct creates, in combination with the pocket according to the disclosure, a discharge valve which enables particularly low-vibration and low-noise operation of the hydraulic assembly. In contrast to this, undesirable noises often occur in conventional discharge valves with a circumferential duct extending along the entire valve seat circumference. Such undesirable noises are generated when the valve body is lifted up by means of continuously changing pressure differences in the fluid pressure at the valve body, in particular if several radial outflow ducts are arranged on the circumferential duct. The valve body moves with the volumetric flow, follows in particular the volumetric flow, therefore changes its position and thus continuously the pressure level of the fluid pressure at the valve body. With the continuous changes in the pressure level, arising vibrations of the valve body can be amplified which ultimately leads to a build-up of vibration of the valve body and to undesirable noises. Such a build-up of vibration is avoided with the pocket according to the disclosure.

The at least one radial outflow duct is furthermore arranged in a fluid-conducting manner according to the disclosure preferably on a segment duct which surrounds the valve seat surrounding the valve opening with its valve seat circumference only along a limited segment of the valve seat circumference. It has been shown that a pressure difference which occurs at the lifted up valve body or the pressure gradient there in the fluid remains largely constant in the segment duct, i.e. does not change. A defined pressure gradient between a high fluid pressure in the direction of flow upstream of the valve body and a fluid pressure which is too low in comparison to this in the direction of flow downstream of the valve body, i.e. in the direction of the segment duct, is thus created. The valve body is sucked by means of the pressure gradient defined in such a manner in a targeted manner in the direction of the segment duct and in the direction of the at least one outflow duct and pushed into the pocket.

The segment duct in the receiving element is preferably arranged on the inner wall of the cavity axially between the circumferential duct and the pocket. The segment duct furthermore particularly preferably has a smaller segment duct width than the circumferential duct with its circumferential duct width and a larger segment duct width than the pocket with its pocket width. A stepped arrangement as seen in the longitudinal section is thus created on the inner wall of the cavity, on which stepped arrangement the valve body can "slip" or slide unhindered properly into the pocket.

According to the disclosure, the limited segment furthermore advantageously extends over an angle between 90° and 180°, preferably between 110° and 160°. With such an angle, a duct wall which restricts the segment duct extends over a sufficiently large region which creates sufficient space for placing or resting the valve body. The segment is also restricted to a dimension with which the location for the valve body in the state lifted up from the valve seat is fixed in such a manner that the valve body retains its position particularly reliably with the fluid then flowing past it. The valve body can thus be pushed into the pocket in a targeted manner.

The at least one radial outflow duct is furthermore according to the disclosure preferably connected to an outer duct in a fluid-conducting manner, which outer duct extends circumferentially outside the circumferential duct over the entire valve seat circumference and, for this purpose, is preferably arranged in the receiving element. Connected in such a manner, all of the fluid during conveying operation is conducted through the at least one outflow duct into such a full-circumference outer duct. The fluid is thus distributed over the full circumference, as a result of which pulsations in the fluid flow are reduced and the valve body can be retained reliably in the pocket.

The disclosure is furthermore also directed at a use of such a discharge valve in a hydraulic assembly of a vehicle brake system. A hydraulic pump which belongs to the hydraulic assembly thus conveys fluid in a particularly low-noise and uniform manner so that the vehicle brake system is also operated in a correspondingly low-noise manner.

BRIEF DESCRIPTION OF THE DRAWINGS

An exemplary embodiment of the solution according to the disclosure is explained in greater detail below on the basis of the enclosed schematic drawings. In the drawings.

DETAILED DESCRIPTION

Figure 1:
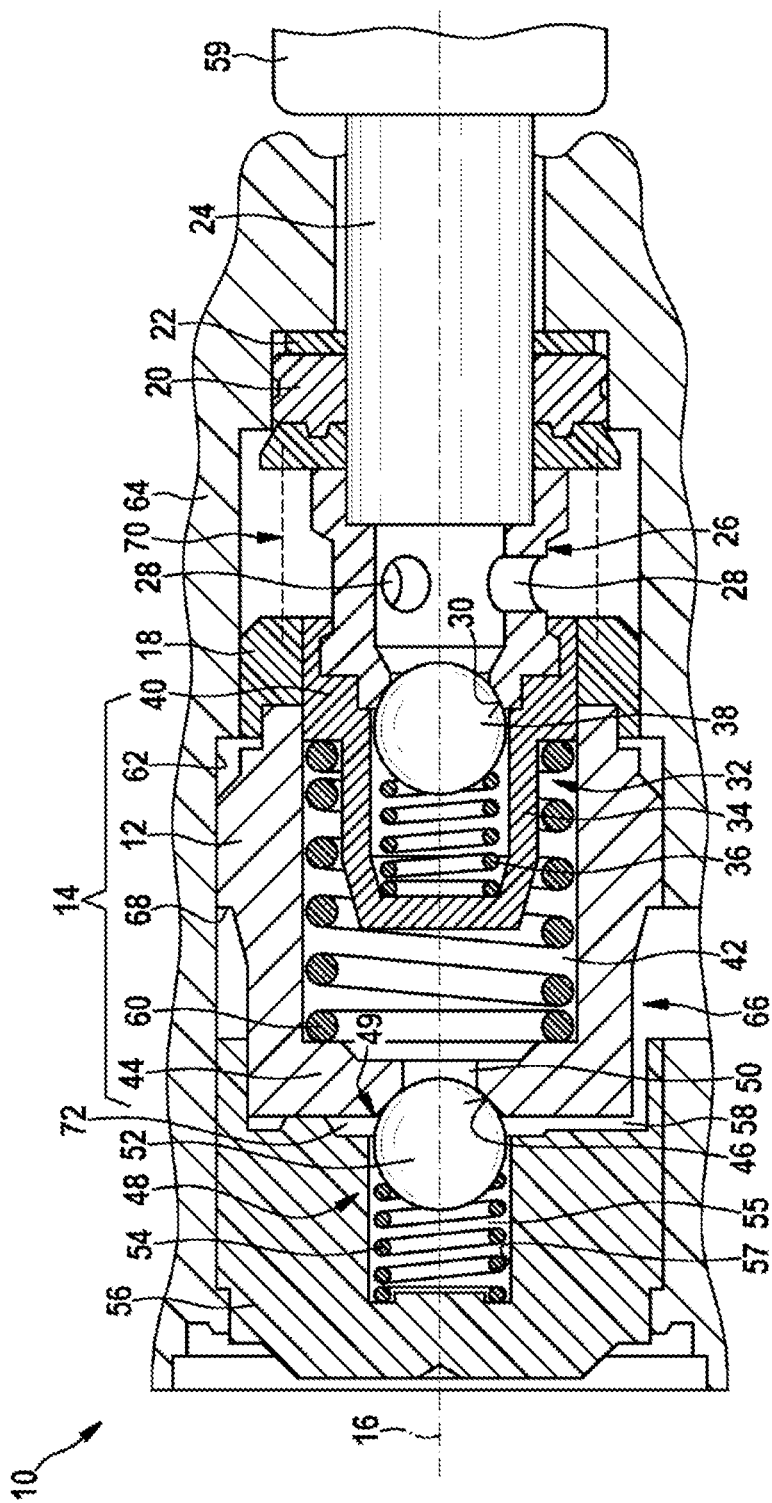
FIG. 1 shows a longitudinal section of a hydraulic pump for a vehicle brake system according to the prior art with an associated discharge valve.

A hydraulic pump 10 for a hydraulic vehicle brake system is illustrated in FIG. 1. Hydraulic pump 10 is provided to convey fluid, in the present case brake fluid, and operates according to the principle of a piston pump. For this purpose, hydraulic pump 10 comprises a cup-shaped cylinder 12, cylinder wall 14 of which extends along a cylinder axis 16. There is located on the open face side of cylinder wall 14 a filter sleeve 18 and, adjoining this, a low-pressure sealing ring 20 as well as a supporting ring 22.

A piston rod 24 of a piston is guided in low-pressure sealing ring 20, which piston further includes a valve seat part 26 which adjoins piston rod 24 in the axial direction. Three inlet openings 28 are formed in valve seat part 26, for conducting brake fluid from a low-pressure region radially inwards to a valve seat 30 of an inlet valve 32. Inlet valve 32 further includes a valve cage 34 as well as a helical restoring spring 36 retained therein and a spherical closing body 38 as a valve body. Valve cage 34 is integral with a high-pressure sealing ring 40 which seals off on the inner side of cylinder wall 14 and thus in cylinder 12 delimits a pressure chamber 42 for the fluid to be conveyed.

A truncated cone-shaped valve seat 46 of a discharge valve 48 is located centrally in circular cylinder base of cylinder 12. Valve seat 46 has a circular valve seat circumference 49 and surrounds a circular valve opening 50 which can be closed off with a spherical closing body or valve body 52. Valve body 52 is pushed by means of a helical restoring spring 54 against valve seat 46, restoring spring 54 being accommodated for this purpose in a cavity 55 of a valve cover 56 and supported on valve cover 56. Cavity 55 has, as the longitudinal axis, cylinder axis 16 and is formed as a hollow cylinder with an inner wall 57 configured as a cylinder jacket. Cavity 55 also serves as a receiving element for receiving valve body 52. If valve body 52 is lifted up from valve seat 46 by fluid flowing through valve opening 50 counter to a spring force of restoring spring 54, valve body 52 is pushed further into cavity 55.

Pushed in such a manner, valve body 52 opens several outflow ducts 58 which are formed as an outlet in valve cover 56 and serve to discharge fluid out of cylinder chamber 42 under pressure. A build-up of pressure required for this purpose is carried out when inserting a piston into cylinder 12. The piston comprises in this case piston rod 24, valve seat part 26 and high-pressure sealing ring 40 and is supported on its piston rod 24 on an eccentric tappet 59. Eccentric tappet 59 is driven by means of a rotating drive shaft, not represented in greater detail, of a motor and moves the piston to and fro axially in cylinder 12. Here, a restoring spring 60 located in pressure chamber 42 acts counter to an inwards piston movement for resetting the piston.

Moreover, with valve cover 56 cylinder 12 and with it filter sleeve 18 as well as low-pressure sealing ring 20 and supporting ring 22 are held back in a housing opening 62, formed as a stepped bore, of a block-shaped pump housing 64. Pump housing 64 is closed off in a fluid-impervious manner with valve cover 56, which thus also serves as a pump cover and seals off a discharge region comprising outflow ducts 58 of the outlet to the outside. Said discharge region 66 is sealed off with a sealing shoulder 68 on cylinder 12 between cylinder 12 and housing opening 62 against an inlet region 70 located at inlet openings 28.

Outflow ducts 58, of which only one outflow duct 58 is visible in FIG. 1, are provided in valve cover 56 at the face side opposite cylinder base 44 and arranged radially on a circumferential duct 72 surrounding valve seat 46. Circumferential duct 72 extends at the face side opposite cylinder base 44 in valve cover 56 along entire valve seat circumference 49 and distributes the volumetric flow of the fluid to outflow ducts 58.

Figure 2:
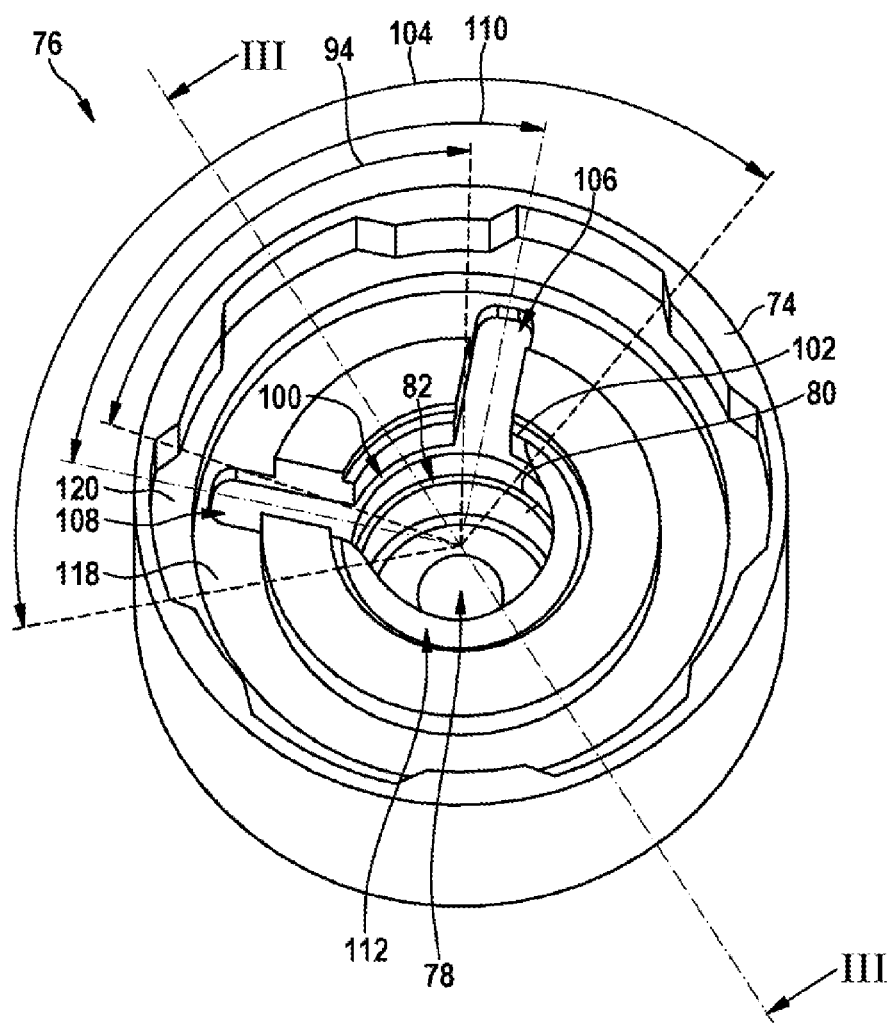
FIG. 2 shows a perspective view of a valve cover of an exemplary embodiment of a discharge valve according to the disclosure and FIG. 3 shows section III according to FIG. 2.
Figure 3:
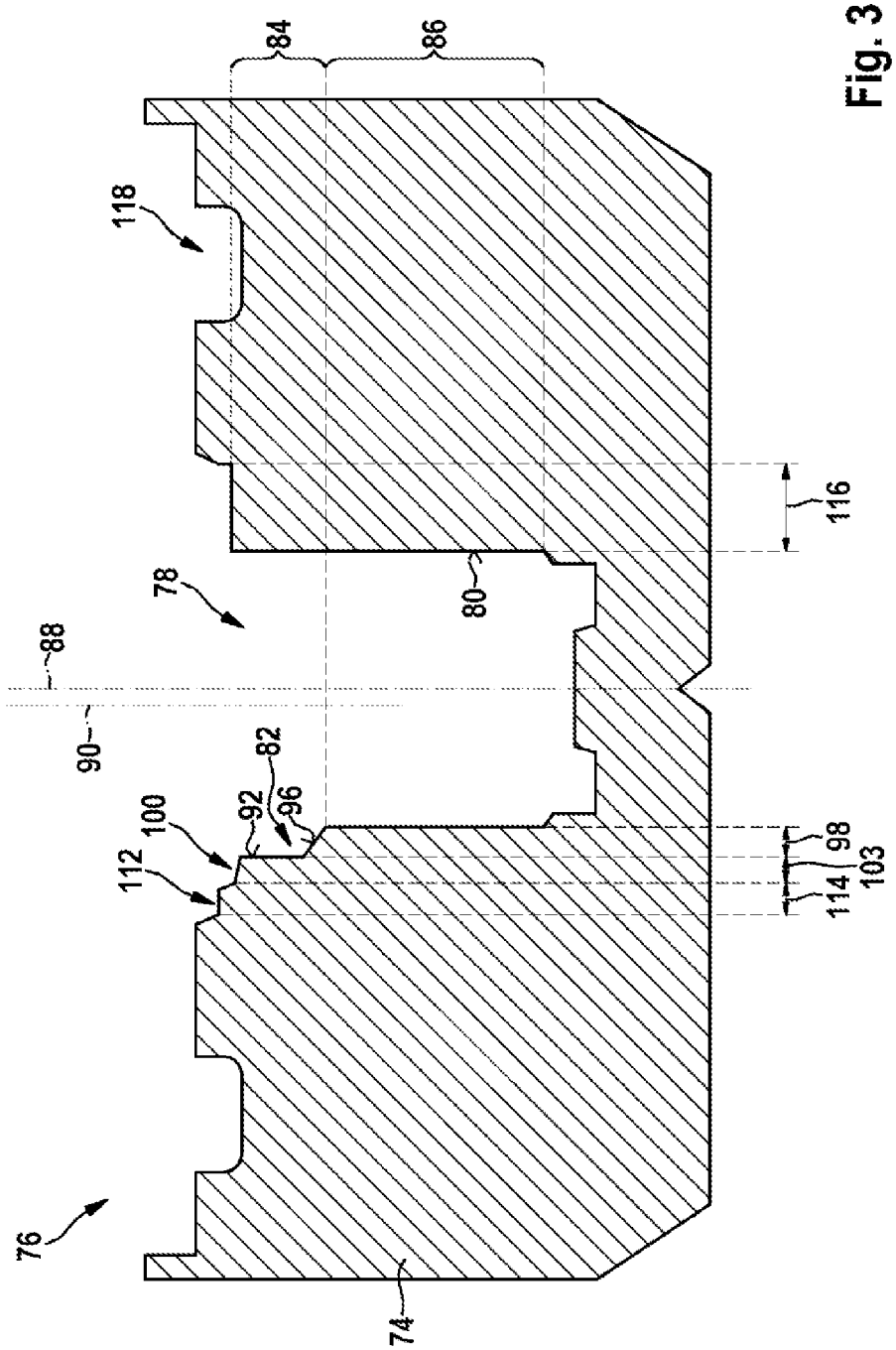

FIGS. 2 to 3 show a valve cover or a receiving element 74 as a relevant detail of a discharge valve 76. Discharge valve 76 only differs from discharge valve 48 in the configuration of receiving element 74. The further components of discharge valve 76 in FIGS. 2 and 3 are therefore not represented in greater detail and correspond to the components according to FIG. 1. Discharge valve 76 thus comprises truncated cone-shaped valve seat 46 which has a circular valve seat circumference 49 and surrounds valve opening 50. Valve opening 50 should be closed off with a valve body 52 configured as a ball, for which purpose valve body 52 is pushed against valve seat 46 with a restoring spring 54 clamped in receiving element 74.

In the present case, receiving element 74 is also the valve cover of discharge valve 76. Receiving element 74 and the valve cover can alternatively also be two components.

In contrast to the receiving element or valve cover 56 represented in FIG. 1, receiving element 74 has a cavity 78 with an inner wall 80 which has a radially outwardly directed pocket 82. Pocket 82 is provided as a bulge or recess in an upper region 84, in relation to FIGS. 2 and 3, of inner wall 80. Cavity 78 furthermore has a region which adjoins region 84 and in which cavity 78 is configured as a circular cylinder with a longitudinal axis 88 which, in the installed state, is congruent with cylinder axis 16 of cylinder 12.

Receiving element 74 is installed in discharge valve 76 in such a manner that upper region 84 is directed towards valve opening 50 and adjoins valve opening 50. Pocket 82 is open towards valve opening 50 and configured cylindrically with a longitudinal axis 90 which runs parallel to longitudinal axis 88 of cavity 78. Circular-cylindrical pocket 82 is therefore formed to be axially parallel to longitudinal axis 88 of cavity 78 and thus arranged eccentrically in relation to cavity 78 and thus also to cylinder 12 and to valve opening 50.

Pocket 82 has a pocket wall 92 which extends in the cross-section of cavity 78 on its inner wall 80 over an angle 94 of approximately 72°. Pocket 82 also has a pocket base 96 which is inclined slightly downwards (in relation to FIG. 3) and has a pocket width 98.

Proceeding from pocket 82, directed towards valve opening 50, there is provided in inner wall 80 in its upper region 84 a segment duct 100 which extends along a limited segment 102 of valve seat circumference 49. Limited segment 102 is configured as a circular ring segment with a segment duct width 103 and has an angle 104 of approximately 145°. A first radial outflow duct 106 and a second radial outflow duct 108 are arranged asymmetrically to one another within said angle 104 in a fluid-conducting manner on segment duct 100. To this end, both radial outflow ducts 106 and 108 enclose an angle 110 of approximately 90°. Both radial outflow ducts 106 and 108 are also positioned on segment duct 100 in such a manner that they are located in an orthogonal projection of both radial outflow ducts 106 and 108 onto a plane with pocket 82 on two opposite end regions of pocket wall 92 and thus on pocket 82.

In addition to segment duct 100, both radial outflow ducts 106 and 108 are arranged in a fluid-conducting manner on a circumferential duct 112. Circumferential duct 112 extends in discharge valve 76 over entire valve seat circumference 49 and is arranged axially between valve opening 50 and segment duct 100. Moreover, circumferential duct 112 is formed in receiving element centrally in relation to longitudinal axis 88 of cavity 78 so that its circumferential duct width 114 on segment duct 100 and thus also on pocket 82 is smaller than its remaining circumferential duct width 116.

An outer duct 118 is furthermore provided which extends in receiving element 74 circumferentially outside circumferential duct 112 also over entire valve seat circumference 49 of discharge valve 76. Both radial outflow ducts 106 and 108, through which fluid discharged by means of circumferential duct 112 and segment duct 100 can be conducted into outer duct 118, are guided in a fluid-conducting manner into said outer duct 118. The fluid can be discharged through at least one axial groove 120 from outer duct 118 into outlet region 66 of pump housing 64.

In longitudinal section, inner wall 80 has in its upper region 84 a stepped contour with a cross-section which increases in the direction of valve opening 50. The stepped contour is formed by means of dimensions increasing in the same direction of pocket width 98, segment duct width 103 and circumferential duct width 114 and the position of pocket 82 eccentric to longitudinal axis 88. Such a contour facilitates sliding of valve body 52 into pocket 82.

During conveying of fluid or a pumping operation, the fluid is pushed under pressure through valve opening 50 and lifts up valve body 52 from its position centered in valve opening 50. By means of flows in the fluid occurring in this case, valve body 52 is pushed into pocket 82 formed eccentrically to longitudinal axis 88 of cavity 78 and is fixed there in its position. The fluid flows or streams through circumferential duct 112 and segment duct 100 and through both radial outflow ducts 106 and 108 into outer duct 118. The fluid is conducted from outer duct 118 through at least one axial groove 120 arranged in receiving element 74 into outlet region 66 of pump housing 64.

Pocket 82 therefore acts as what is known as a "ball centering pocket" which aligns and retains the valve body in a defined position. Retained in such a manner, the fluid can no longer cause valve body 52 to vibrate with its flow so that objectionable flow noises are avoided and a particularly low-noise discharge valve 76 is created. Otherwise, in the event of a sufficiently high flow speed of the fluid, the fluid would cause valve body 52 to vibrate and also possibly to rotate in the case of outflow through outflow ducts 106 and 108.

The invention claimed is:

1. A discharge valve for a hydraulic pump of a hydraulic assembly, comprising: a valve seat that defines a valve opening;
   a valve body configured to close off the valve opening;
   a receiving element that adjoins the valve opening,
   a cavity defined by the receiving element and configured to receive the valve body a first portion of the cavity immediately adjacent the valve seat, the first portion defining a first longitudinal axis and having a first radius defined by an inner wall; and
   a pocket of the cavity positioned radially outward from the first portion and configured to receive the valve body so that at least a portion of the valve body is positioned outside of the first portion and inside of the pocket, the pocket defining a second longitudinal axis offset from the first longitudinal axis and having a second radius defined by the inner wall, the first radius, the second radius, and the offset defining a diameter of the cavity.

2. The discharge valve as claimed in claim 1, wherein the pocket is open toward the valve opening.

3. The discharge valve as claimed in claim 1, wherein the pocket has a cylindrical shape that is axially parallel to the first longitudinal axis.

4. The discharge valve as claimed in claim 1, wherein the pocket has an angular extent, about the second longitudinal axis, on the inner wall, between 30° and 180°.

5. The discharge valve as claimed in claim 1, wherein the receiving element further defines at least one radial outflow duct at an axial location directly adjacent to an axial location of the pocket.

6. The discharge valve as claimed in claim 5, wherein:
   the at least one outflow duct includes a first radial outflow duct and a second radial outflow duct; and
   the second radial outflow duct extends asymmetrically to the first radial outflow duct.

7. The discharge valve as claimed in claim 5, wherein: the receiving element further defines a circumferential duct that surrounds the first longitudinal axis; and the at least one radial outflow duct is positioned on the circumferential duct in a fluid conducting fashion.

8. The discharge valve as claimed in claim 5, wherein:
the receiving element further defines a segment duct which is open toward the valve opening, and which surrounds less than an entirety of a circumference of the cavity; and
the at least one radial outflow duct is positioned on the segment duct.

9. The discharge valve as claimed in claim 8, wherein the segment duct has an angular extent, about the second longitudinal axis, between 90° and 180°.

10. The discharge valve as claimed in claim 1, wherein the receiving element further defines an outer duct that extends circumferentially outside of the cavity over an entire circumference of the cavity, and that is fluidically connected to the cavity through at least one radial outflow duct.

11. A discharge valve for a hydraulic pump of a hydraulic assembly, comprising:
a valve seat that defines a valve opening;
a receiving element that adjoins the valve opening;
at least one radial outflow duct defined in the receiving element;
a cavity defined in the receiving element a first portion of the cavity defining a first longitudinal axis and having a first radius defined by an inner wall; and
a pocket of the cavity positioned radially outwardly from the first portion relative to the first longitudinal axis, the pocket defining a second longitudinal axis offset from the first longitudinal axis and located such that the at least one radial outflow duct is axially between the pocket and the valve opening, the pocket having a second radius defined by the inner wall; and
a valve body at least partially received in the cavity, and movable (i) away from the at least one radial outflow duct to a first position whereat the valve body is coaxial with the first longitudinal axis, and whereat the valve body closes off the valve opening, and (ii) toward the at least one radial outflow duct to a second position whereat the valve body is eccentric to the first longitudinal axis and at least a portion of the valve body is positioned outside of the first portion and is received in the pocket, wherein the first radius, the second radius, and the offset define a cavity diameter.

12. The discharge valve as claimed in claim 11, wherein the pocket is open toward the valve opening.

13. The discharge valve as claimed in claim 11, wherein the pocket has a cylindrical shape that is axially parallel to the first longitudinal axis.

14. The discharge valve as claimed in claim 11, wherein the pocket has an angular extent, about the second longitudinal axis, on the inner wall between 30° and 180°.

15. The discharge valve as claimed in claim 11, wherein:
the at least one outflow duct includes a first radial outflow duct and a second radial outflow duct; and
the second radial outflow duct extends asymmetrically to the first radial outflow duct.

16. The discharge valve as claimed in claim 11, wherein:
the receiving element further defines a circumferential duct that is open to the valve seat and that surrounds the cavity; and
the least one radial outflow duct is positioned on the circumferential duct in a fluid conducting fashion.

17. The discharge valve as claimed in claim 11, wherein:
the receiving element further defines a segment duct which is open toward the valve opening, and which surrounds less than an entirety of a circumference of the cavity; and
the least one radial outflow duct is positioned on the segment duct.

18. The discharge valve as claimed in claim 17, wherein the limited segment has an angular extent, about the longitudinal axis, between 90° and 180°.

19. The discharge valve as claimed in claim 11, wherein the receiving element further defines an outer duct that extends circumferentially outside of the cavity over an entire circumference of the cavity, and that is fluidically connected to the cavity through at least one radial outflow duct.

20. A discharge valve for a hydraulic pump of a hydraulic assembly, comprising:
a valve seat that defines a valve opening;
a valve body configured to close off the valve opening;
a receiving element that adjoins the valve opening;
a cavity defined by the receiving element and configured to receive the valve body; a first portion of the cavity immediately adjacent the valve seat;
a pocket of the cavity positioned radially outward from the first portion and configured to receive at least a portion of the valve body so that at least a portion of the valve body is positioned outside of the first portion and within the pocket;
an outer duct defined by the receiving element, the outer duct spaced apart from the cavity by an inner wall that defines a diameter of the cavity, and extending circumferentially outside of the cavity over an entire circumference of the cavity; and
at least one radial outflow duct fluidically connecting the cavity to the outer duct.

* * * * *